United States Patent
Mujica

(10) Patent No.: US 7,221,754 B2
(45) Date of Patent: May 22, 2007

(54) SWITCHABLE HYBRID DESIGN FOR ASYMMETRIC DIGITAL SUBSCRIBER LINE

(75) Inventor: Fernando A. Mujica, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 567 days.

(21) Appl. No.: 10/356,787

(22) Filed: Feb. 1, 2003

(65) Prior Publication Data

US 2003/0147355 A1 Aug. 7, 2003

Related U.S. Application Data

(60) Provisional application No. 60/354,698, filed on Feb. 5, 2002.

(51) Int. Cl.
*H04M 3/00* (2006.01)

(52) U.S. Cl. ............................. 379/402; 370/254

(58) Field of Classification Search ........ 379/402–405, 379/399.01, 398, 394, 391, 392, 390.04, 379/387.01
See application file for complete search history.

(56) References Cited

U.S. PATENT DOCUMENTS

| | | | | |
|---|---|---|---|---|
| 4,246,582 A | 1/1981 | Kondo et al. | ................. | 370/32 |
| 4,276,450 A * | 6/1981 | Chowaniec | ............ | 379/406.01 |
| 4,785,465 A | 11/1988 | Lang et al. | ..................... | 375/7 |
| 5,416,776 A | 5/1995 | Panzarella et al. | ....... | 370/85.11 |
| 5,506,868 A | 4/1996 | Cox et al. | .................... | 375/222 |
| 5,572,517 A | 11/1996 | Safadi | .......................... | 370/50 |
| 5,623,514 A | 4/1997 | Arai | ........................... | 375/222 |
| 5,696,765 A | 12/1997 | Safadi | ....................... | 370/436 |
| 5,802,169 A | 9/1998 | Frantz et al. | ............... | 379/398 |
| 5,999,540 A | 12/1999 | McGhee | .................... | 370/465 |
| 5,999,565 A | 12/1999 | Locklear, Jr. et al. | ........ | 375/222 |
| 6,101,216 A | 8/2000 | Henderson et al. | ......... | 375/222 |
| 6,160,843 A | 12/2000 | McHale et al. | ............. | 375/222 |
| 6,163,579 A | 12/2000 | Harrington et al. | ......... | 375/257 |
| 6,192,109 B1 | 2/2001 | Amrany et al. | ............... | 379/30 |
| 6,208,732 B1 | 3/2001 | Moschytz | | |
| 6,295,343 B1 | 9/2001 | Hjartarson et al. | ...... | 379/93.05 |
| 6,385,203 B2 | 5/2002 | McHale et al. | ............. | 370/401 |
| 6,385,252 B1 | 5/2002 | Gradl et al. | ................ | 375/257 |
| 6,400,772 B1 | 6/2002 | Chaplik | ...................... | 375/258 |
| 6,483,870 B1 | 11/2002 | Locklear, Jr. et al. | ....... | 375/222 |
| 6,804,349 B1 * | 10/2004 | Prat et al. | .................... | 379/402 |
| 2001/0048716 A1 | 12/2001 | Gough et al. | ............... | 375/222 |

FOREIGN PATENT DOCUMENTS

WO WO 00 79693 A 12/2000

* cited by examiner

*Primary Examiner*—Sinh Tran
*Assistant Examiner*—Walter F Briney, III
(74) *Attorney, Agent, or Firm*—Steven A. Shaw; W. James Brady; Frederick J. Telecky, Jr.

(57) ABSTRACT

A method is provided for accomplishing asymmetric digital subscriber loop classification and the design of passive hybrid networks for each of the classes. The resulting hybrids are suitable for implementation in a switchable hybrid architecture.

18 Claims, 7 Drawing Sheets

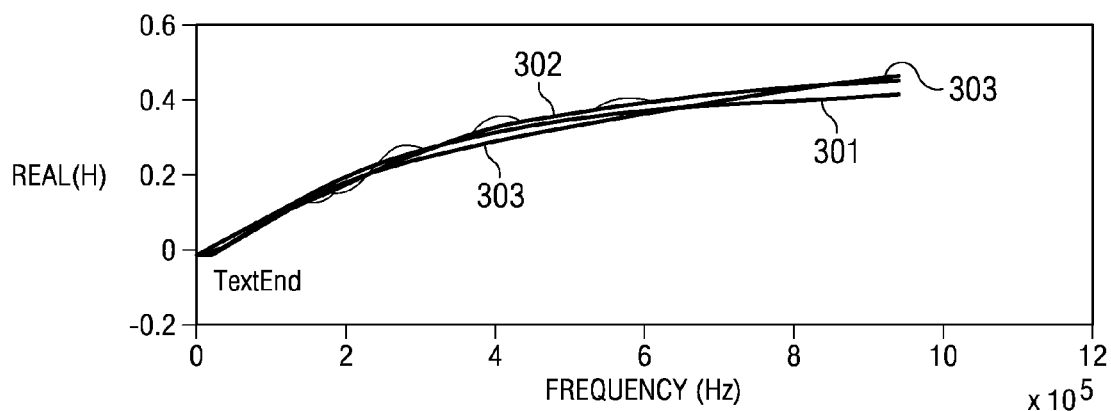
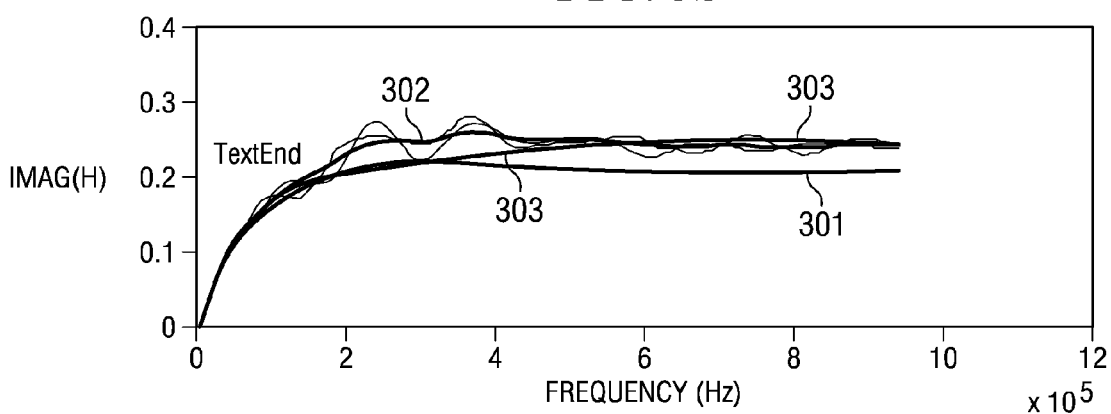
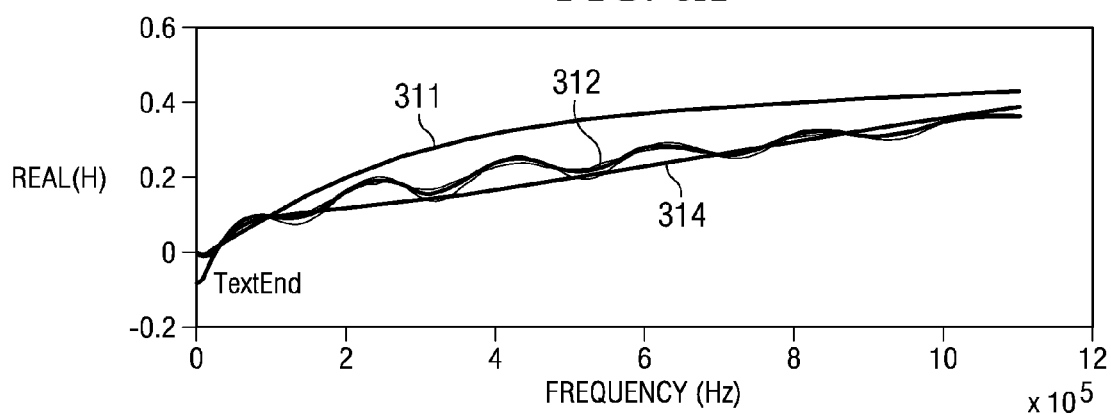

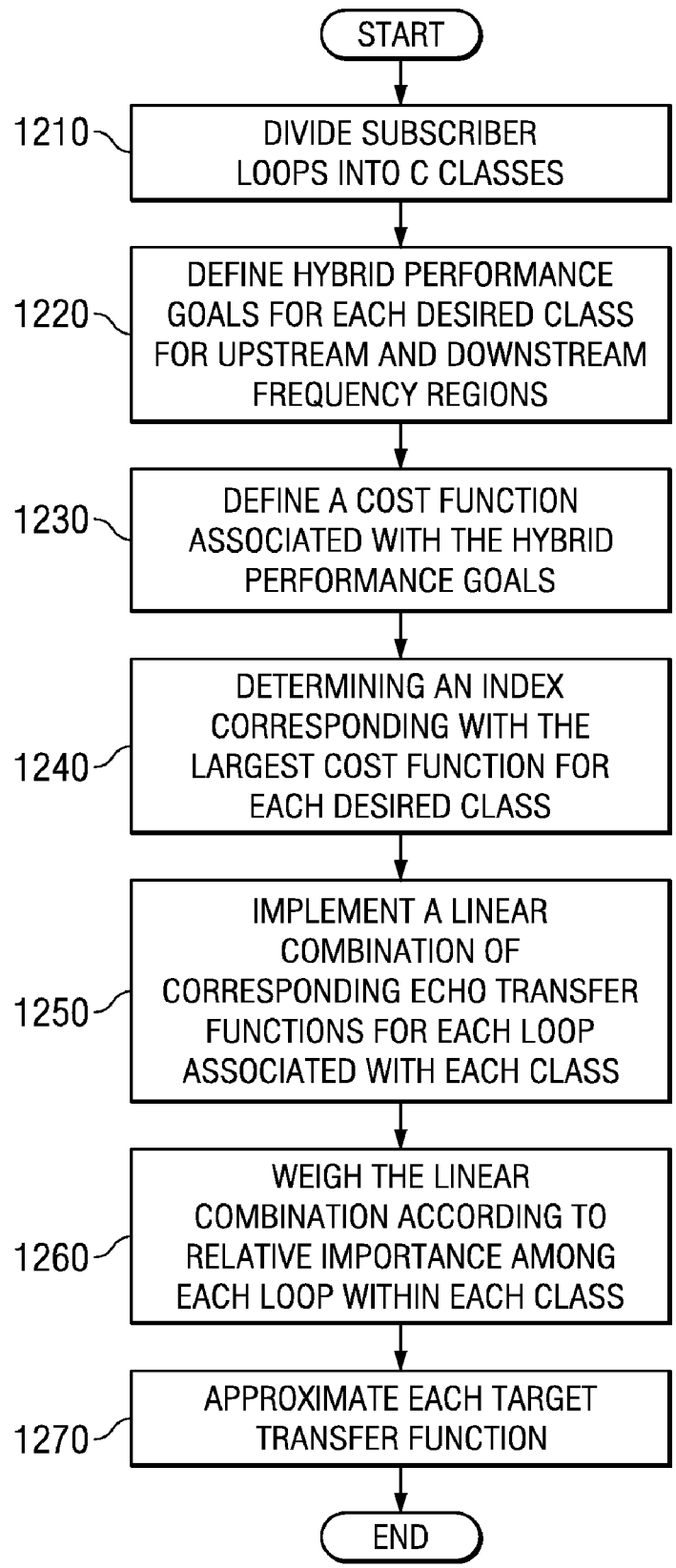

SWITCHABLE HYBRID DESIGN FOR ASYMMETRIC DIGITAL SUBSCRIBER LINE

RELATED PATENT APPLICATIONS

This application claims the benefit, under 35 U.S.C. § 119(e)(1), of U.S. Provisional Application No. 60/354,698, entitled SWITCHABLE HYBRID DESIGN FOR ADSL, filed Feb. 5, 2002 by Fernando A. Mujica.

BACKGROUND OF THE INVENTION

1. Field of the Invention

This invention relates generally to ADSL hybrid networks, and more particularly to a method of providing a switchable hybrid design suitable for ADSL applications.

2. Description of the Prior Art

The goal of the hybrid network is to model the transmit echo path transfer function to perform analog echo cancellation. Using a passive termination line driver, the transmit echo transfer function is given by $$H_{Echo}(f) = \frac{Z'_L(f)}{R_T + Z'_L(f)}$$

where $Z'_L$ is the line impedance as seen from the receive terminals (modem side) of the transformer. Denoting the hybrid transfer function as $H_{Hyb}$, the hybrid echo rejection is defined as $$H_{Echo\ Rejection}(f) = H_{echo}(f) - H_{Hyb}(f)$$

It is well known that the line impedance, and therefore $Z'_L$, varies a great deal for different loop topologies, in particular in the presence of bridge-taps. FIGS. 1a and 1b illustrate the severity of the problem in which real and imaginary parts of the impedance are shown for straight loops (FIG. 1a) and some bridge tap loops (FIG. 1b) respectively.

It is clear that a single hybrid network cannot achieve the same cancellation levels for all possible loop scenarios. It would therefore be advantageous in view of the foregoing to provide an adaptive hybrid network capable of achieving substantially the same cancellation levels for all possible loop scenarios associated with a particular application.

SUMMARY OF THE INVENTION

The present invention is directed to a method of accomplishing loop classification and the design of hybrid networks for each of the classes. The resulting hybrids are suitable for implementation in a switchable hybrid architecture.

A method according to one embodiment of the invention comprises the steps of dividing a plurality of subscriber loops into a desired number 'C' of classes; determining a target transfer function for each class; and approximating each target transfer function with a linear system capable of being synthesized in hardware.

According to another embodiment, an adaptive passive hybrid system comprises a plurality of passive hybrid networks, each passive hybrid network having a corresponding optimized hybrid transfer function; and a switching element configured to selectively switch each passive hybrid network, such that each passive hybrid network operates to substantially match its corresponding optimized hybrid transfer function with an associated transmit echo transfer function for a desired class of asymmetric digital subscriber loops.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIGS. 5a and 5b illustrate resulting class 1 target transfer functions associated with a plurality of classes when using a $2^{nd}$ order linear system approximation and passive hybrid transfer functions;

FIGS. 6a and 6b illustrate resulting class 2 target transfer functions associated with a plurality of classes when using a $2^{nd}$ order linear system approximation and passive hybrid transfer functions;

FIG. 12 is a flowchart illustrating process steps performed according to an embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

In practice, the adaptability of the hybrid network is realized through the selection of a subset of hybrid networks. Selecting among the possible hybrid networks is done based on channel analysis information obtained during modem initialization.

Figure 1A:
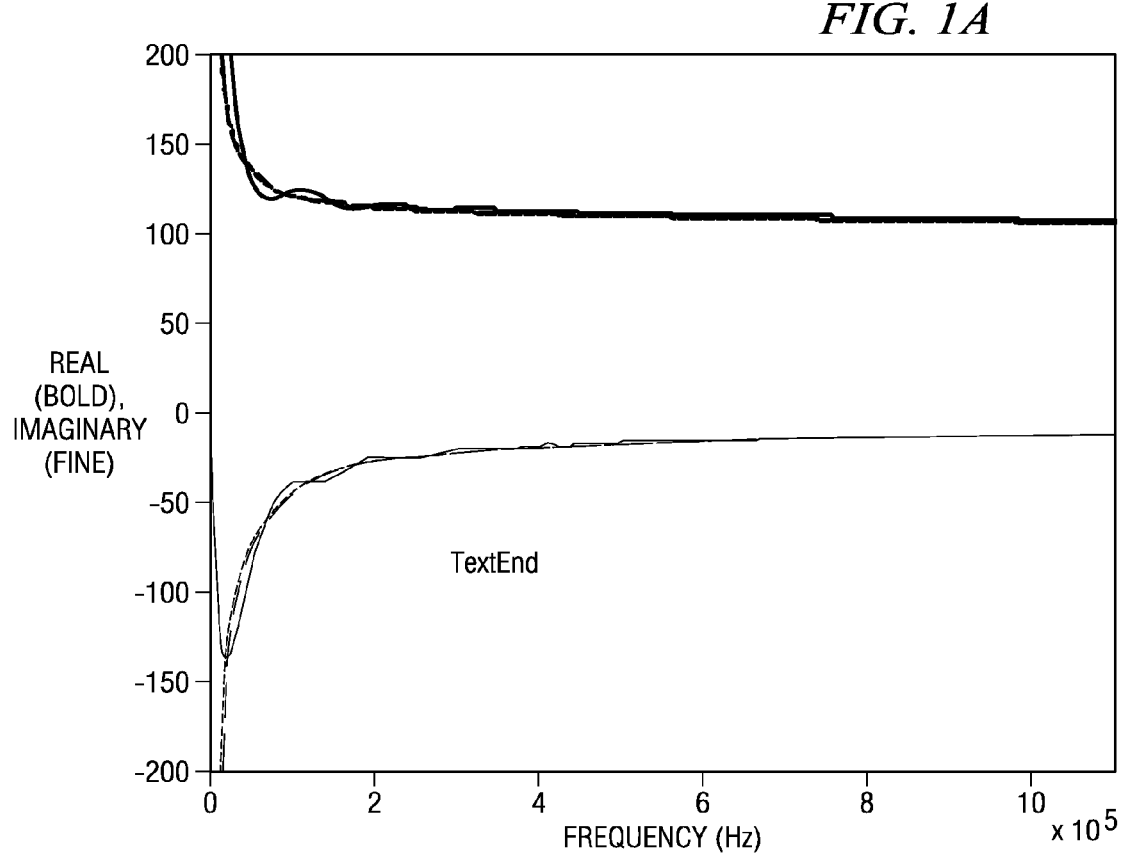
FIGS. 1a and 1b are graphs illustrating real and imaginary parts of the impedance for straight loops and some bridge tap loops respectively.
Figure 1B:
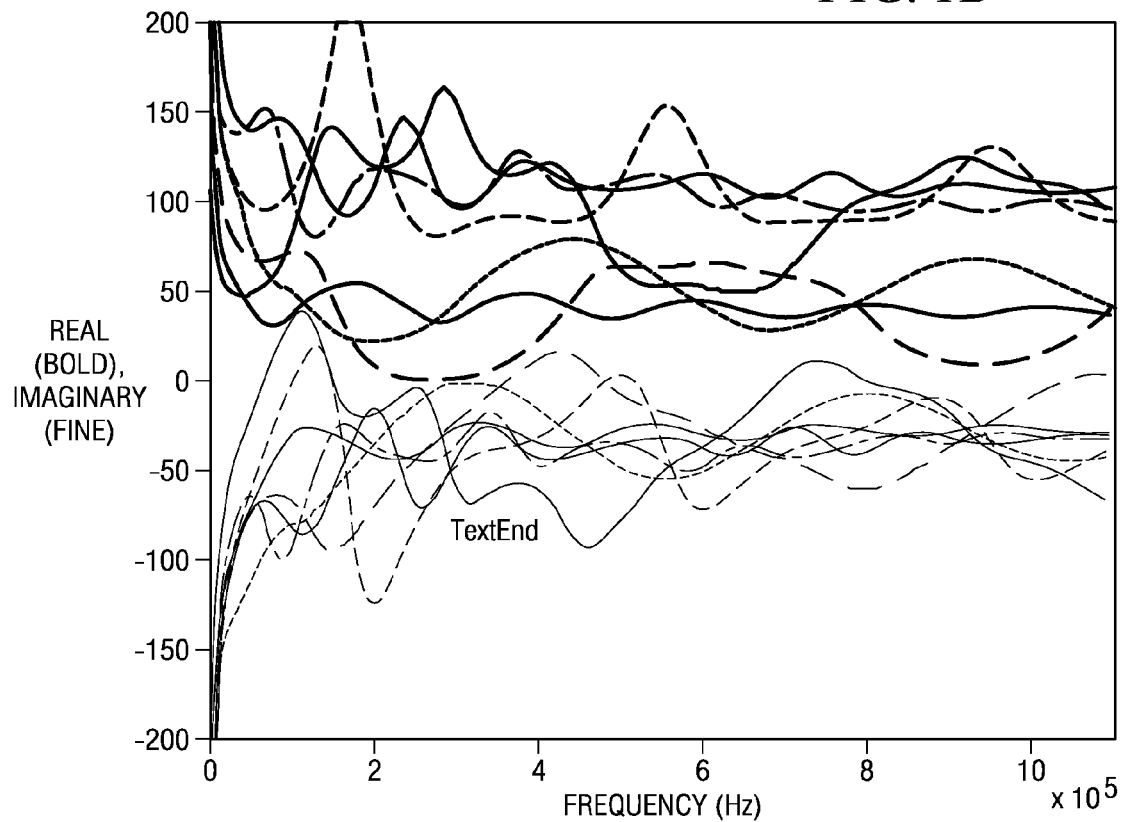
Figure 2:
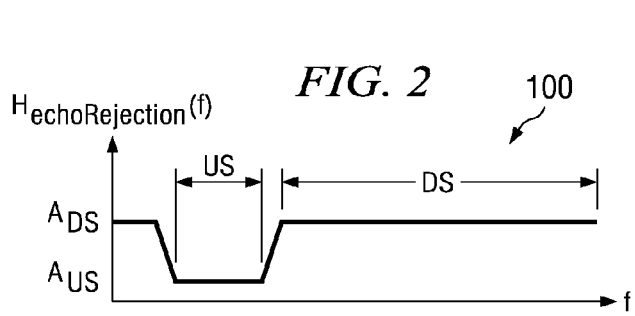
FIG. 2 is a diagram illustrating the general shape of a target minimum hybrid echo cancellation transfer function.

The hybrid network must operate over the upstream and downstream frequency bands. The hybrid echo cancellation in the upstream ($A_{US}$) band is needed to prevent saturation of the receiver. As such, the quantity of interest is the total power attenuation in the upstream band or $$A_{US}(H_{Echo\ Rejection}) = \frac{1}{f_{+US} - f_{-US}} \int_{f_{-US}}^{f_{+US}} H_{Echo\ Rejection}(f) df,$$

with $f_{+US}$ and $f_{-US}$ the maximum and minimum frequencies in the upstream band, respectively. The hybrid echo cancellation in the downstream band ($A_{DS}$) is needed to further reduce the out-of-band transmit noise. In this case, the figure of merit is the minimum attenuation in the downstream band or $$A_{DS}(H_{Echo\ Rejection}) = \min_{f-DS<f<f+DS}(H_{Echo\ Rejection}(f)),$$

with $f_{+DS}$ and $f_{-DS}$ the minimum and maximum frequencies in the downstream band, respectively. Since the energy in the upstream band is much larger than the out-of-band noise, the hybrid is designed to provide higher rejection in the upstream band relative to the rejection in the downstream band. The general shape of the hybrid echo cancellation transfer function 100 is depicted in FIG. 2.

Figure 3:
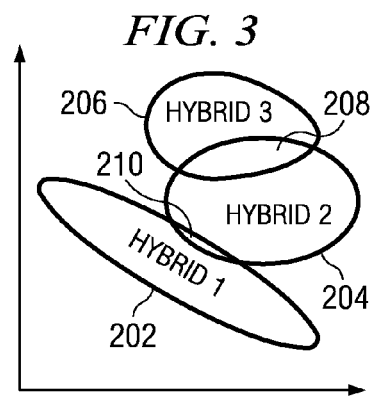
FIG. 3 is a diagram depicting a digital subscriber line "space" and sub-sets of associated loops for which a corresponding hybrid achieves the target minimum hybrid echo rejection transfer function.

The adaptive hybrid solution according to one embodiment requires the design of a number of hybrid networks which result in acceptable performance for all loops belonging to the corresponding class. As such, loops must be classified into classes before the actual hybrid networks can be realized. In FIG. 3, a representation according to one embodiment is shown of all possible loops 200 and sub-sets 202, 204, 206 for which the indicated hybrid achieves the hybrid echo rejection targets. Loops that fall within one of these subsets are guaranteed to result in a hybrid echo rejection of at least $A_{US}$ and $A_{DS}$ in the upstream and downstream bands, respectively. Most preferably, the intersection(s) 208, 210 of these sub-sets will cover most loops of practical interest. The present inventor recognized that the echo cancellation "space" is actually multi-dimensional; and the problem at hand is therefore one of clustering.

Classification methodology according to the particular embodiments presented herein are best understood when first noticing that the best hybrid transfer function for a particular loop condition is $$H_{Hyb}(f) = H_{Echo}(f),$$

which results in infinite hybrid rejection. Similarly, the best hybrid transfer function for a particular group of loops must be a linear combination (maybe weighted) of the corresponding echo transfer functions $H_{Echo,k}(f)$ for each of the loops in the group, i.e., $$H^*_{Hyb}(f) = \frac{1}{K}\sum_{k=1}^{K} H_{Echo,k}(f),$$

where K is the number of echo transfer functions (loops) considered in the group. If the relative importance of one loop versus another within the group is known, a weighted version of the previous expression can be used, i.e., $$H^*_{Hyb}(f) = \frac{1}{\sum \alpha_k}\sum_{k=1}^{K} \alpha_k H_{Echo,k}(f).$$

Thus, the target hybrid transfer function of a particular class is formed as the "center of mass" of the cluster.

According to one embodiment, classification is done in the following way. Assume first the loops in consideration belong to the set $J=(1, \ldots K)$ with K the total number of loops, and that we want to divide the loops into C classes. Next, define the hybrid performance goals per class as $A_{US(1)}, \ldots, A_{US(C)}$, and $A_{DS(1)}, \ldots, A_{DS(C)}$, for the upstream and downstream frequency regions, respectively. With these definitions and setting $J_1=J$, we can form $$\left.\begin{array}{l}A_{US}(m,n) = A_{US}(H_{Echo,m} - H_{Echo,n}) \\ A_{DS}(m,n) = A_{DS}(H_{Echo,m} - H_{Echo,n})\end{array}\right\} \text{ with } n, m \in J_1$$

which represents the hybrid performance for loop 'n' when the echo rejection for loop 'm' is used as the hybrid transfer function.

A cost function $M_1$ is now defined as $$M_1(m) = \sum_{n \in J_1} A_{US}(m,n) + A_{DS}(m,n) \text{ with } m \in J_1.$$

The index '$m_1$' corresponding to the largest $M_1$ represents the loop index with the largest number of "closer" loops. Loop $m_1$ and its $K_1$ closest loops are then assigned to class $C_1$. The process is then iterated for the next class using the remainder of the loops, i.e., $$J_2 = \left\{\frac{J}{J_1}\right\}.$$

In general, each iteration uses the loops not previously classified, or $$J_c = \left\{\frac{J}{J_1, \ldots, J_{c-1}}\right\}$$

with $c=(1, \ldots, C)$; and the (sparse) matrices can then be formed as $$M_c(m) = \sum_{n \in J_c} A_{US}(m, n) + A_{DS}(m, n) \text{ with } m \in J_c.$$

The index '$m_c$' corresponding to the largest $M_c$ represents the loop index with the largest number of "closer" loops. Loop $m_c$ and its $K_c$ closest loops are then assigned to class $C_c$. After the classification iteration is completed, the target hybrid function for each class can then be determined as described herein before by calculating the (weighted) average of all echo transfer functions for all loops in the class.

It is possible that certain loops were not properly classified, such that the set $$J_{C+1} = \left\{ \frac{J}{J_1, \ldots, J_C} \right\}$$

is non-empty, the reason being that these loops did not satisfy the performance goals used in the classification stage. In this case, all loops in $J_{C+1}$ can be assigned to the class that results in the best performance using the corresponding target hybrid transfer function.

Once the target transfer functions for each class have been found, they must then be approximated with a linear system that can be synthesized in hardware, i.e., $$\tilde{H}_{Hyb}(s) = \frac{b_{N_B} s^{N_B} + \ldots + b_{1S}^1 + b_0}{a_{N_A} s^{N_A} + \ldots + a_{1S}^1 + a_0}.$$

The order of the system is typically constrained by the complexity of the hardware; and it is a design parameter. The numerator and denominator coefficients can be determined by finding a least squares fit of the linear system to the target hybrid transfer function, i.e., $$\min_{\substack{b_{N_B}, \cdots, b_0 \\ a_{N_A}, \cdots, a_0}} \left( \int W(f) |\tilde{H}_{Hyb}(2\pi f j) - H^*_{Hyb}(f)|^2 df \right).$$

The weighting function $W(f)$ an be used to improve the approximation over a particular frequency region, typically, upstream band.

The next step is to verify that the hybrid approximation is satisfactory in terms of performance a compared with that for the target hybrid transfer function. Finally, the resulting model is synthesized in an actual hardware implementation.

Intuitively, the higher the hybrid performance goals the more classes will be needed. Further, the order of the linear model approximations most likely would increase also for certain classes. Thus, when only few hybrid options are available, a lower order approximation might be more appropriate, as it will be able to capture the "average" behavior of the class rather than the detailed characteristics.

It is also possible to find the least square fit of a transfer function with C real poles and zeros.

$$\tilde{H}_{Hyb}(s) = K \frac{s - z_1}{s - p_1} \frac{s - z_2}{s - p_2} \cdots \frac{s - z_C}{s - p_C}$$

Table 1 shows the test loops considered in one loop classification example. The loop index is used to refer to the particular loop in the plots shown in FIGS. 4a and 4b.

TABLE 1

Test loops.

| Loop type | Loop number | Variable length segment (ft) | Loop index |
|---|---|---|---|
| 26 AWG | — | 3000 | 1 |
|  | — | 6000 | 2 |
|  | — | 9000 | 3 |
|  | — | 12000 | 4 |
|  | — | 15000 | 5 |
| CSA | 1 | — | 6 |
|  | 2 | — | 7 |
|  | 4 | — | 8 |
|  | 5 | — | 9 |
|  | 7 | — | 10 |
| ANSI | 2 | — | 11 |
|  | 5 | — | 12 |
|  | 6 | — | 13 |
|  | 9 | — | 14 |
|  | 12 | — | 15 |
|  | 13 | — | 16 |

Figure 4A:
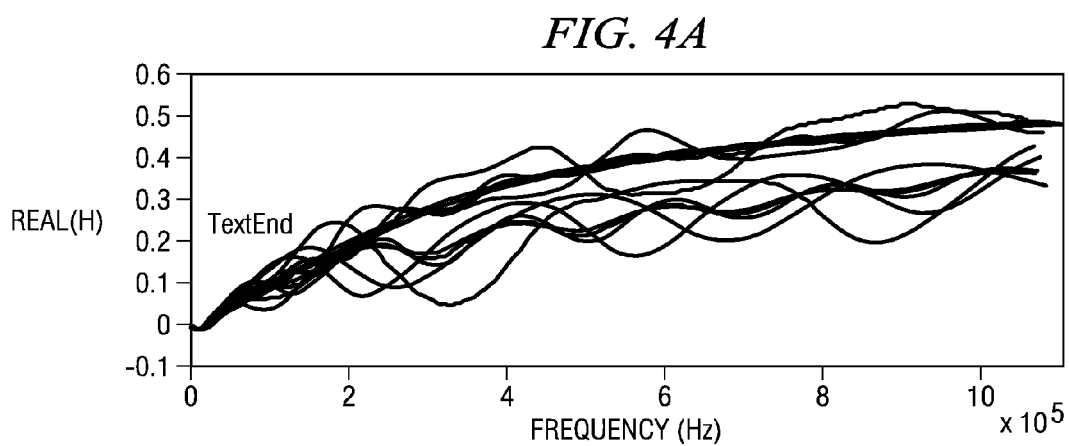
FIGS. 4a and 4b illustrate echo transfer functions (including first stage HPF) for all loops of interest associated with one exemplary loop classification.
Figure 4B:
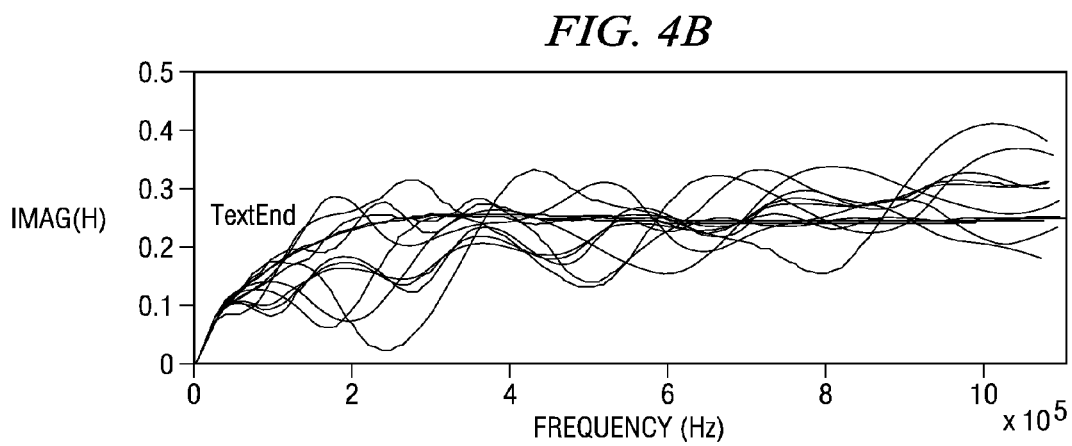
Figure 6B:
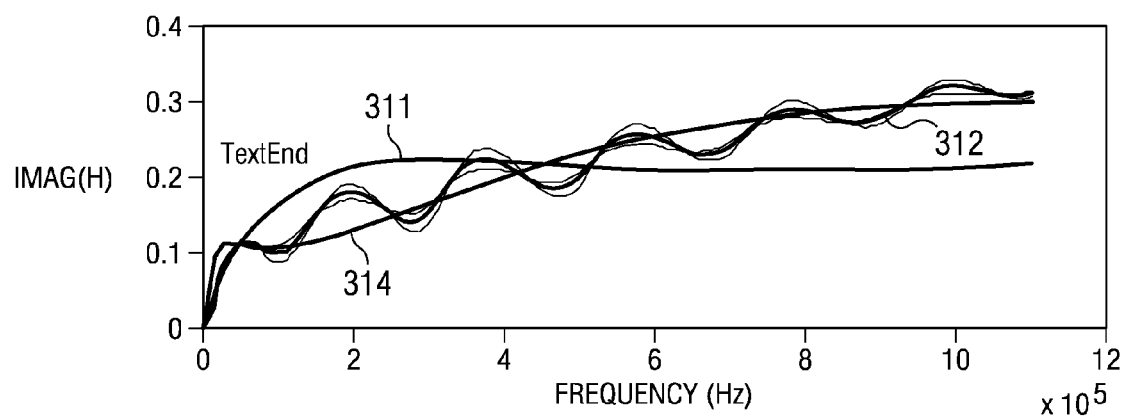
Figure 7A:
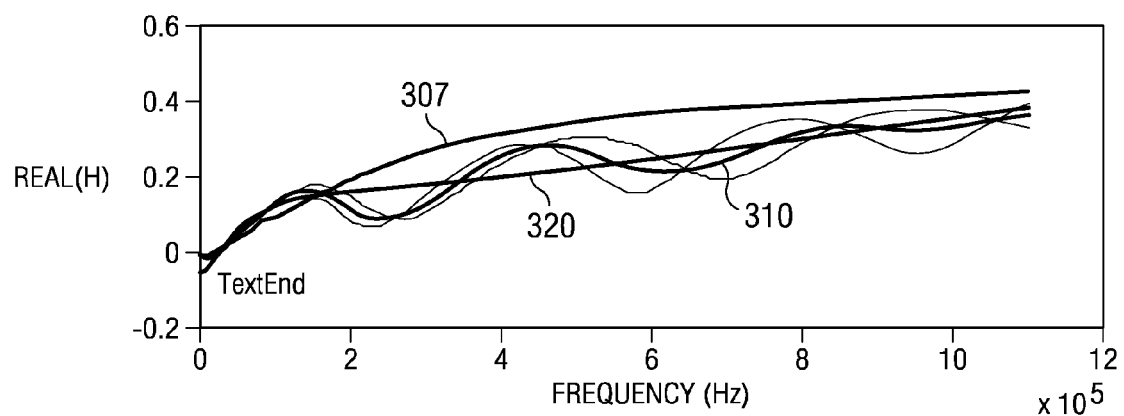
FIGS. 7a and 7b illustrate resulting class 3 target transfer functions associated with a plurality of classes when using a $2^{nd}$ order linear system approximation and passive hybrid transfer functions.
Figure 7B:
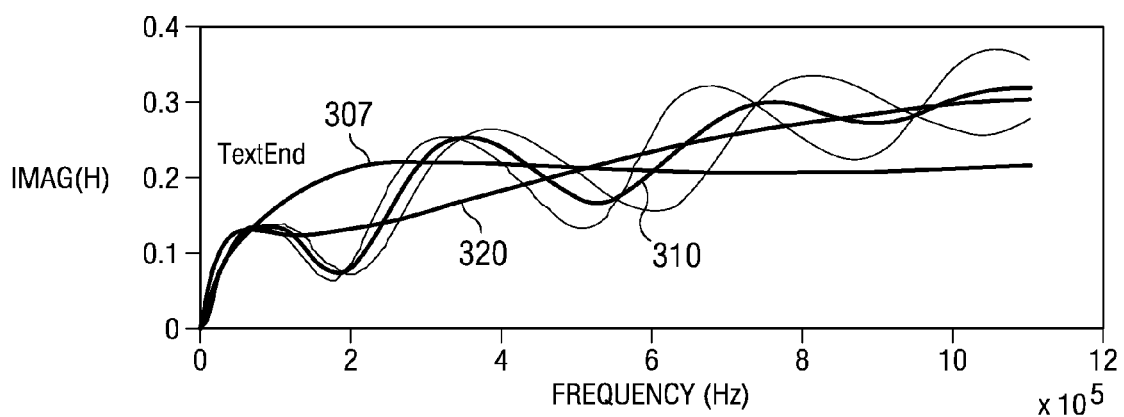

The particular system employed in the loop classification examples discussed herein comprised a A×5 (TI $5^{th}$ generation ADSL client-side codec) front-end available from Texas Instruments Incorporated of Dallas, Tex., with a Schott 33818 transformer, two 68 nF coupling capacitors, and a first-stage receive high pass filter (HPF) with a transfer function defined by $$H_{HPF}(s) = \frac{R_0}{R} \frac{s}{s + \frac{1}{RC}},$$

with $R=R_o=732$ ohm and $C=680$ pF. The echo transfer functions for the loops, including the first stage HPF, are shown in FIGS. 4a and 4b. Three classes (C=3) were employed, in which $A_{US(1)} = A_{US(2)} = A_{US(3)} = 35$ dB and $A_{DS(1)} = A_{DS(2)} = A_{DS(3)} = 15$ dB.

The final classification is shown in Table 2. Loops marked with an asterisk were assigned after the initial classification was performed.

TABLE 2

Loop classification results.

| Class | Loop | Loop index |
|---|---|---|
| 1 | AWG 26 3000 | 1 |
|  | AWG 26 6000 | 2 |
|  | AWG 26 9000 | 3 |
|  | AWG 26 12000 | 4 |
|  | AWG 26 15000 | 5 |
|  | CSA 1 | 6 |
|  | CSA 5 | 9 |
|  | ANSI 12 | 15 |
|  | CSA 4* | 8 |

TABLE 2-continued

Loop classification results.

| Class | Loop | Loop index |
|---|---|---|
|  | ANSI 6* | 13 |
|  | ANSI 13* | 16 |
| 2 | ANSI 2* | 11 |
|  | ANSI 5 | 12 |
|  | ANSI 9 | 14 |
| 3 | CSA 2 | 7 |
|  | CSA 7 | 12 |

The resulting target hybrid transfer functions 302, 312, 310 are shown for each of the classes (1, 2 and 3) in FIGS. 5a and 5b, FIGS. 6a and 6b and FIGS. 7a and 7b respectively along with the echo transfer functions of the loops in the corresponding class (thin curves). The $2^{nd}$ order linear system approximation ($N_B=N_A=2$) is also depicted in FIGS. 5-7 by curves 303, 314, 320 respectively; while curves 301, 311, 307 depict a passive hybrid transfer function using a A×5 hybrid discussed herein before.

Figure 8:
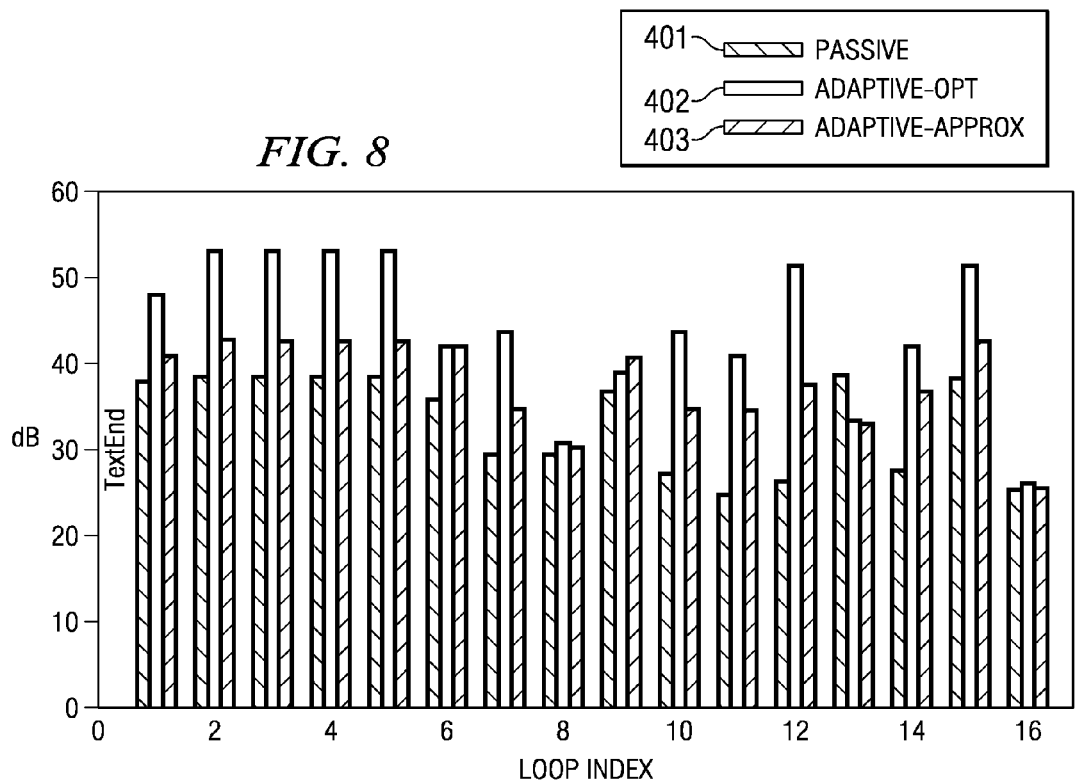
FIG. 8 depicts upstream performance comparisons for all loops associated with a passive hybrid, an adaptive hybrid optimum solution (target hybrid transfer functions) and an adaptive hybrid approximation ($2^{nd}$ order linear system)
Figure 9:
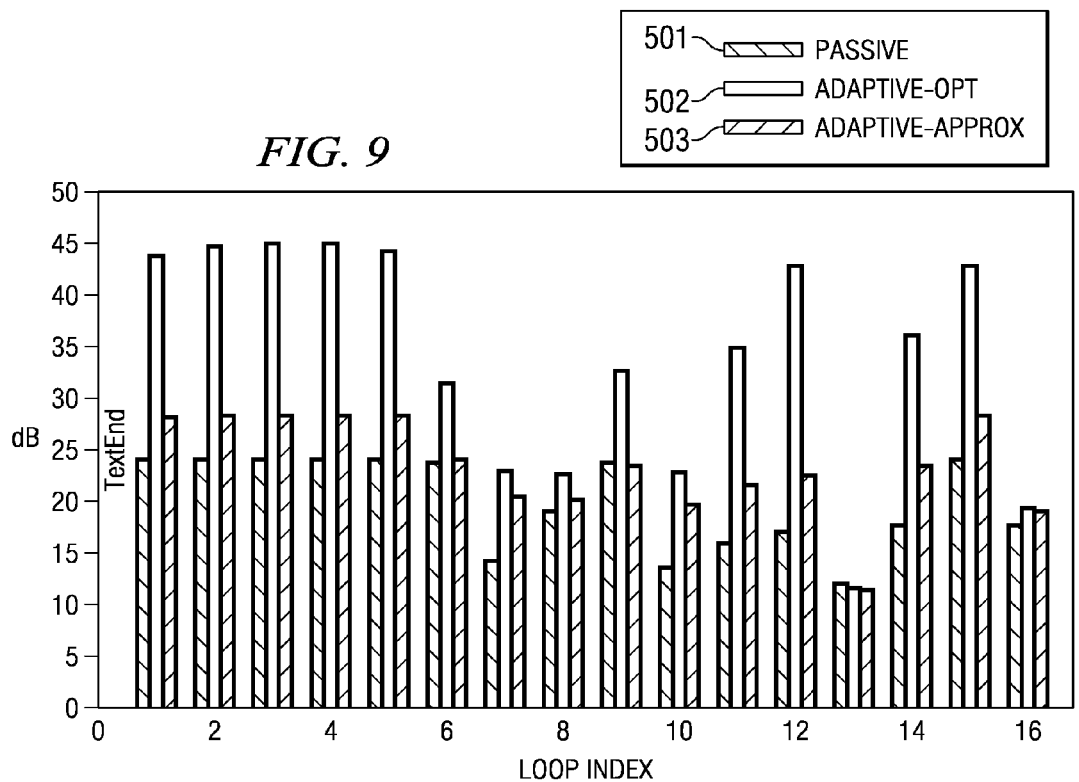
FIG. 9 depicts downstream performance comparisons for all loops associated with a passive hybrid, an adaptive hybrid optimum solution (target hybrid transfer functions) and an adaptive hybrid approximation ($2^{nd}$ order linear system)

The upstream and downstream performance comparison 400, 500 between the passive 401, 501, adaptive optimum (target hybrid transfer function) 402, 502 and adaptive approximation ($2^{nd}$ order transfer function) 403, 503 are shown in FIGS. 8 and 9 respectively. The adaptive hybrid optimum solution 402, 502 outperforms the passive 401, 501 for almost all loops. Similarly, the adaptive hybrid approximation 403, 503 offers gains with respect to the passive solution 401, 501 but not as dramatic as with the optimum hybrid solution 402, 502, yet significant enough to justify its implementation.

Figure 10:
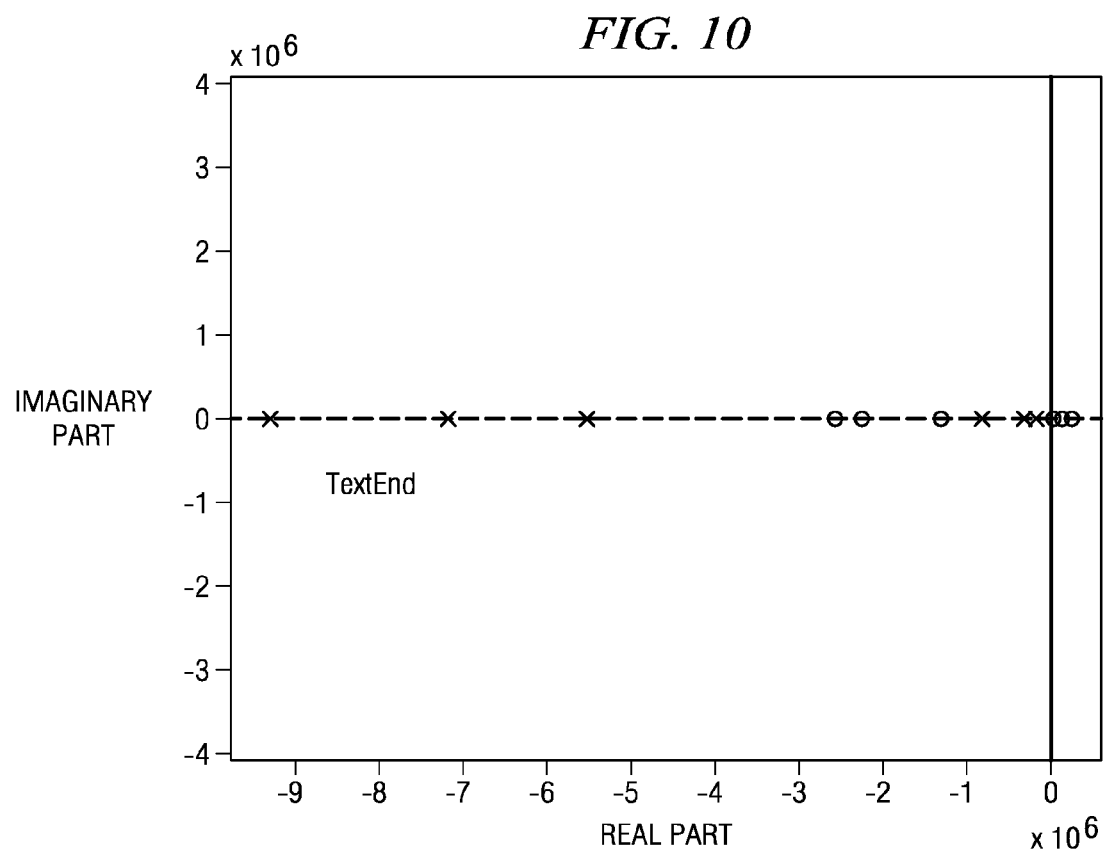
FIG. 10 shows a pole-zero plot for three $2^{nd}$-order hybrids.

Examination of the $2^{nd}$ order approximation for each of the hybrids reveals that they have only real poles and zeros as seen in FIG. 10. This result is not surprising since the hybrid has to emulate the first stage HPF which has a zero at DC and a real pole. There is therefore no other alternative for the additional pole and zero but to lie on the real axes as well. This result is significant because it demonstrates that for a second order hybrid, it is not required to implement the hybrid as an active network (arbitrary coefficient second order section). Instead, the hybrid can be implemented with a passive network; and the subtracting operation can be implemented with the same op-amp used for the first stage HPF.

Figure 11:
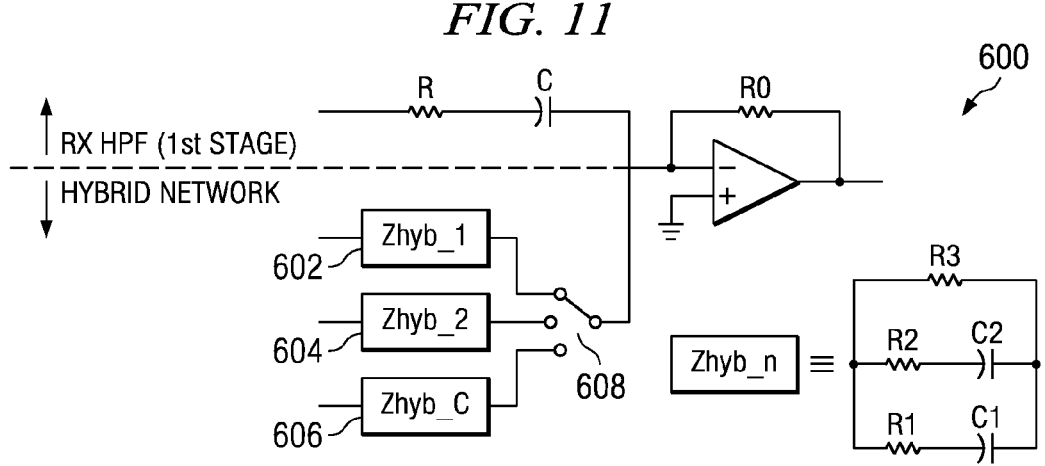
FIG. 11 depicts a receive HPF and an adaptive hybrid topology associated with C passive hybrid networks according to one embodiment of the present invention.

One appropriate topology 600 is shown in FIG. 11. The transfer function of the hybrids 602, 604, 606 is given by $$H_{Hyb}(s) = \frac{R0}{R3} \frac{1 + (C1R1 + C2R2 + C1R3 + C2R3)s + C1C2(R1R2 + R1R3 + R2R3)s^2}{(1 + C1R1s)(1 + C2R2s)}.$$

Using Mathematica, the parameters of the three hybrid networks are then readily determined by equating the resulting $2^{nd}$ order hybrid models with the hybrid network transfer functions. The $2^{nd}$ order models and the corresponding solutions are shown below as $$H_{Hyb1} = \frac{-1.6569 \times 10^{-11} s^2 - 4.1947 \times 10^{-5} s + 1}{-2.4759 \times 10^{-11} s^2 - 1.5652 \times 10^{-4} s - 111.2731}$$

$$H_{Hyb1} = \frac{-5.9774 \times 10^{-12} s^2 - 7.1478 \times 10^{-6} s + 1}{-8.6488 \times 10^{-12} s^2 - 6.3617 \times 10^{-5} s - 11.5212}$$

$$H_{Hyb1} = \frac{-5.5509 \times 10^{-12} s^2 - 1.2111 \times 10^{-5} s + 1}{-7.0687 \times 10^{-12} s^2 - 6.7762 \times 10^{-5} s - 20.2392}$$

Hybrid 1 solution:
R1=1731, R2=2867, R3=−81452, C1=1.0492e-10, C2=4.27334e-10
Hybrid 2 solution:
R1=1243, R2=3872, R3=−8434, C1=1.1220e-10, C2=1.3901e-9
Hybrid 3 solution:
R1=1181, R2=3403, R3=−14815, C1=9.1232e-11, C2=9.5224e-10

The present inventor recognized that the negative R3 values could be easily implemented by taking the opposite signal from the differential implementation.

Using this topology 600, one of C passive hybrid networks can be selected by using switches 608, which may, for example, be integrated into a codec. This approach is depicted in FIG. 11.

Since the circuit topology 600 is differential, two extra pins were found to be required for each additional hybrid option. One embodiment, for example, may include the addition of two hybrid options or 4 pins for a total of 3 possible hybrid networks. This topology was found to offer the greatest flexibility in one embodiment where all the hybrid components are external passive elements (resistors and capacitors).

FIG. 12 is a flowchart illustrating process steps executed according to an embodiment. Initially, subscriber loops are divided into a desired number of C classes (1210). Hybrid performance goals for each desired class is determined for multiple upstream and downstream frequency regions (1220). Then, a cost function associated with the hybrid performance goals is determined (1230). An index corresponding with the largest cost function for each desired class is determined such that a subscriber loop associated with its respective index is assigned to its desired class along with a desired number of closest loops (1240). A linear combination of corresponding echo transfer functions for each loop associated with each class is then implemented (1250). The linear combination is then weighed according to relative importance among each loop within each class such that a target transfer function is formed as the center of mass of the loops associated with each respective class (1260). Finally, each target transfer function is approximated (1270).

In summary explanation, a methodology has been described to accomplish loop classification and the design of hybrid networks for each of the classes. The resulting hybrids were shown to be suitable for implementation in a switchable hybrid architecture. Implementation examples and estimated performance were presented.

This invention has been described in considerable detail in order to provide those skilled in the ADSL hybrid art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, while certain embodiments set forth herein illustrate various hardware implementations, the present invention shall be understood to also parallel structures and methods using software implementations as set forth in the claims.

What is claimed is:

1. A method of implementing a switchable hybrid network for an asymmetric digital subscriber line, the method comprising the steps of:
dividing a plurality of subscriber loops into a desired number 'C' of classes and defining hybrid performance goals for each desired class for a plurality of upstream and downstream frequency regions;
determining a target transfer function for each class; and
approximating each target transfer function with a linear system capable of being synthesized in hardware.

2. The method according to claim 1 wherein the step of dividing a plurality of subscriber loops into a desired number of 'C' classes comprises the steps of: defining a cost function associated with the hybrid performance goals; and
determining an index corresponding with the largest cost function for each desired class such that a subscriber loop associated with its respective index is assigned to its desired class along with a desired number of closest loops.

3. The method according to claim 1 wherein the step of determining a target transfer function for each class comprises the step of implementing a linear combination of corresponding echo transfer functions for each loop associated with each class.

4. The method according to claim 3 wherein the step of determining a target transfer function for each class further comprises the step weighting the linear combination according to relative importance among each loop within each class, such that each target transfer function is formed as the center of mass of the loops associated with each respective class.

5. The method according to claim 1 wherein the step of approximating each target transfer function with a linear system capable of being synthesized in hardware comprises the step of determining the numerator and denominator coefficients of the linear system in response to a least squares fit of the linear system to the target hybrid transfer function for each class.

6. The method according to claim 1 wherein the step of approximating each target transfer function with a linear system capable of being synthesized in hardware comprises the step of finding the least squares fit of each target transfer function with 'C' real poles and zeros.

7. The method according to claim 1 further comprising the step of implementing an adaptive passive hybrid system having 'C' passive hybrid networks and configured to switchably select the 'C' passive hybrid networks into the adaptive passive hybrid system such that loops belonging to each class are constrained to substantially meet performance goals associated with the corresponding class.

8. An adaptive passive hybrid system comprising:
a plurality of passive hybrid networks, each passive hybrid network having a corresponding optimized hybrid transfer function; and
a switching element configured to selectively switch each passive hybrid network, such that each passive hybrid network operates to substantially match its corresponding optimized hybrid transfer function with an associated transmit echo transfer function for a desired class of asymmetric digital subscriber loops
wherein each correspond optimized hybrid transfer function is defined by desired hybrid performance goals associated with a desired plurality of subscriber loops for a plurality of upstream and downstream frequency reasons.

9. The adaptive passive hybrid system according to claim 8 further comprising a first stage high pass filter configured to filter input signals passing through the plurality of passive hybrid networks.

10. the adaptive passive hybrid system according to claim 9 further comprising a differential output circuit configured to generate an output signal in response to the filtered input signals passing through the plurality of passive hybrid networks.

11. The adaptive passive hybrid system according to claim 8 wherein each passive hybrid network comprises solely resistors and capacitors.

12. A method of implementing an adaptive hybrid network for an asymmetric digital subscriber line, the method comprising the steps of:
dividing a plurality of subscriber loops into a desired number 'C' of classes;
defining hybrid performance goals for each desired class for a plurality of upstream and downstream frequency regions;
defining a cost function associated with the hybrid performance goals;
determining an index corresponding with the largest cost function for each desired class such that a subscriber loop associated with its respective index is assigned to its desired class along with a desired number of closest loops;
implementing a linear combination of corresponding echo transfer functions for each loop associated with each class;
weighting the linear combination according to relative importance among each loop within each class, such that a target transfer function is formed as the center of mass of the loops associated with each respective class; and
approximating each target transfer function with a linear system capable of being synthesized in hardware.

13. The method according to claim 12 wherein the step of approximating each target transfer function with a linear system capable of being synthesized in hardware comprises determining numerator and denominator coefficients of the linear system in response to a least squares fit of the linear system to the target hybrid transfer function for each class.

14. The method according to claim 12 wherein the step of approximating each target transfer function with a linear system capable of being synthesized in hardware comprises the step of finding the least squares fit of each target transfer function with 'C' real poles and zeros.

15. The method according to claim 12 further comprising the step of implementing a switchable hybrid system having 'C' passive hybrid networks and configured to switchably select the 'C' passive hybrid networks into the switchable hybrid system such that loops belonging to each class are constrained to substantially meet performance goals associated with the corresponding class via a corresponding single passive hybrid network.

16. The method according to claim 12 wherein the step of defining hybrid performance goals for each desired class comprises defining hybrid echo cancellation in the upstream and downstream bands for each class.

17. The method according to claim 16 wherein the step of defining hybrid echo cancellation in the upstream and downstream bands for each class comprises defining hybrid echo cancellation associated with loops constrained solely within a corresponding class.

18. The method according to claim 12 further comprising the step of assigning loops that do not satisfy the performance goals into the class resulting in best performance using the corresponding target hybrid transfer function.

* * * * *